United States Patent [19]
Littlejohn et al.

[11] Patent Number: 5,274,311
[45] Date of Patent: Dec. 28, 1993

[54] CONTROL SYSTEM NETWORK STRUCTURE

[75] Inventors: Douglas J. Littlejohn, Sunnyvale; John Golini, Los Gatos, both of Calif.

[73] Assignee: Quest Technologies, Inc., Sunnyvale, Calif.

[21] Appl. No.: 792,217

[22] Filed: Nov. 13, 1991

[51] Int. Cl.⁵ ............................................. H04J 3/00
[52] U.S. Cl. ................................... 318/562; 318/139; 318/600
[58] Field of Search ............... 364/424.01, 424.05, 364/426.01; 318/567, 568.1, 568.11, 568.16, 568.17, 568.18, 568.2, 568.24, 562, 139, 565, 569, 600; 370/77, 82, 83, 85.1, 105.1; 340/870.13, 870.14

[56] References Cited

U.S. PATENT DOCUMENTS

| | | | |
|---|---|---|---|
| 4,090,248 | 5/1978 | Swanson et al. | 364/900 |
| 4,104,731 | 8/1978 | Grudowski et al. | 364/900 |
| 4,470,092 | 9/1984 | Lombardi | 364/483 X |
| 5,130,631 | 7/1992 | Gordon et al. | 318/568.11 |

*Primary Examiner*—Bentsu Ro
*Attorney, Agent, or Firm*—Townsend and Townsend Khourie and Crew

[57] ABSTRACT

The present invention imports network communication concepts into a motor and/or motion control system. The motor and/or motion control system is divided into various modules. A preferred configuration includes a motor drive control module, a user command module, and a master control module. The modules are interconnected by a simple hardware bus, such as an RS-485 bus. Communication between the modules is accomplished using a time division protocol.

3 Claims, 7 Drawing Sheets

CONTROL SYSTEM NETWORK STRUCTURE

BACKGROUND

The present invention relates to the interconnections between various elements of a motor and/or motion control system, in particular a wheelchair control system.

Typically, a motor and/or motion control system is designed for the particular arrangement being used. User inputs would be connected directly to a microprocessor or other controller, which then is connected directly to the motor elements and sensor feedbacks for the control system. As different variations of a particular arrangement of elements are put together, the connections are varied to accomplish the new goals. Such systems typically place a premium on speed of achieving the control, with little concern for bandwidth. Typically, not a lot of information is being transferred back and forth, thus dictating a simple approach with high speed.

SUMMARY OF THE INVENTION

The present invention imports network communication concepts into a motor and/or motion control system. The motor and/or motion control system is divided into various modules. A preferred configuration includes a motor drive control module, a user command module, and a master control module. The modules are interconnected by a simple hardware bus, such as an RS-485 bus. Communication between the modules is accomplished using a time division protocol.

Each module is assigned an ID number, and is assigned a time frame corresponding to its ID. Each module transmits in its particular time frame, and maintains its own clock to determine when it is its time frame. Each module also monitors the bus for transmissions that may be addressed to it and also to synchronize its transmissions. Each module thus periodically updates its own clock to maintain synchronization from the last valid transmission received.

Preferably, the system operates by transmitting status information rather than event information. Thus, each module transmits its status and the desired status of a receiving module, with the information being constantly transmitted. This eliminates the need for determining whether any particular transmission has been received since a transmission error will be overcome by the next status word which will present the same information. The system of the present invention provides a very simple, resilient communication arrangement ideally suited for motor and/or motion control. Very simple hardware and handshaking is obtained at the expense of limited bandwidth and a significant amount of software monitoring of the network. However, this is well-suited for a motor and/or motion control system in which a limited amount of information is transmitted.

For a fuller understanding of the nature and advantages of the present invention, reference should be made to the ensuing detailed description taken in conjunction with the accompanying drawings.

DETAILED DESCRIPTION OF THE PREFERRED EMBODIMENTS

Figure 1:
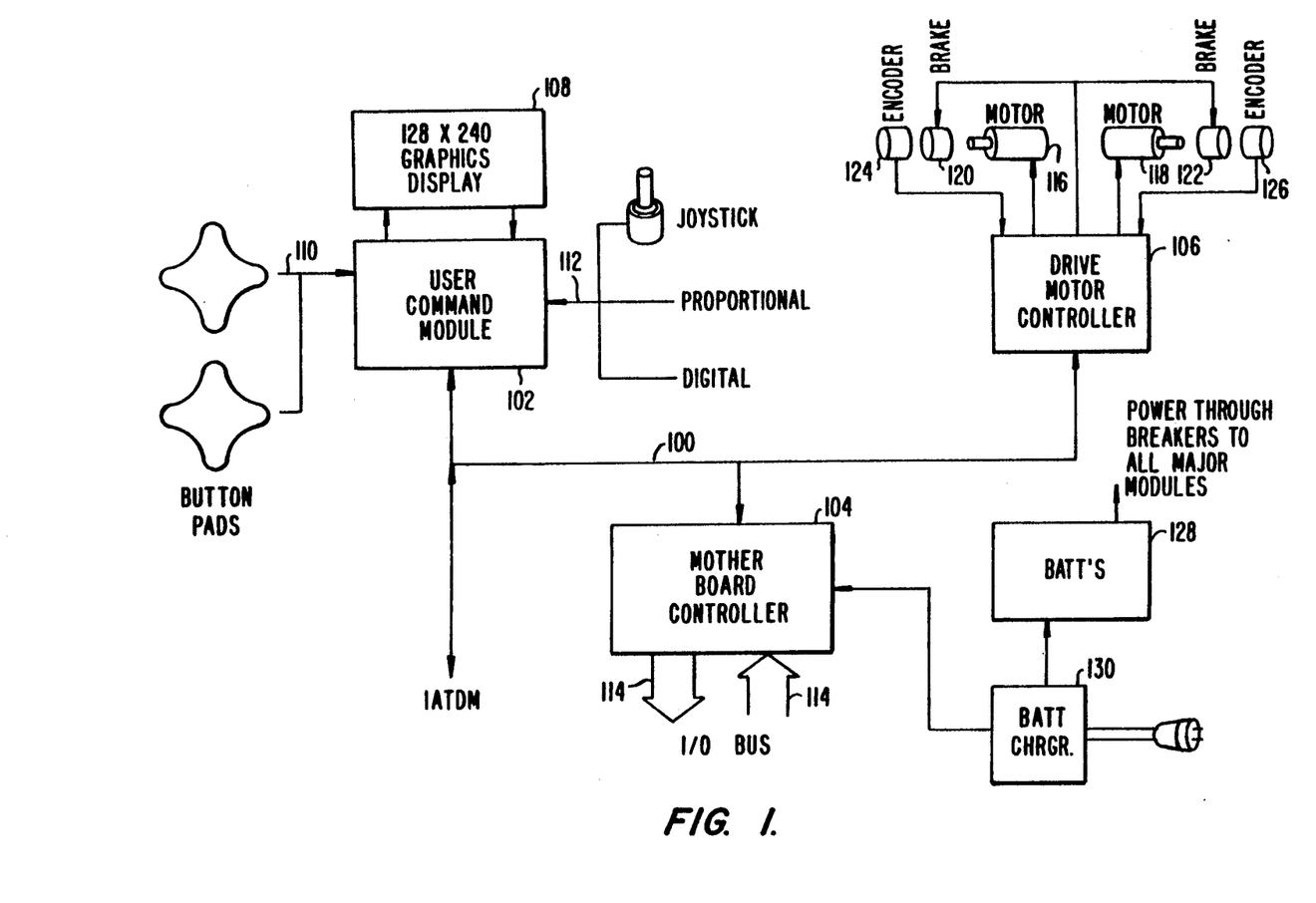
FIG. 1 is a block diagram of a three-module wheelchair motor control system using the present invention.

FIG. 1 shows a preferred embodiment of a wheelchair motor control system utilizing the present invention. There are three modules interconnected by RS-485 bus 100. Those modules are a user command module 102, a motherboard controller module 104 and a drive motor controller module 106. User command module 102 connects to an LCD display 108. Multiple button inputs are connected to user command module 102 through input lines 110. Other inputs are connected through input lines 112.

Motherboard controller module 104 include I/O bus 114 which allows direct I/O connections or plug-in intelligent I/O modules. Drive motor controller module 106 connects directly to motors 116, 118, brakes 120, 122 and feedback sensor encoders 124, 126. Other motors and sensors, such as a seat-tilting motor and sensor, etc., are not shown in this diagram. The system is battery controlled by a battery 128 which is charged by a battery charger 130.

Figure 2:
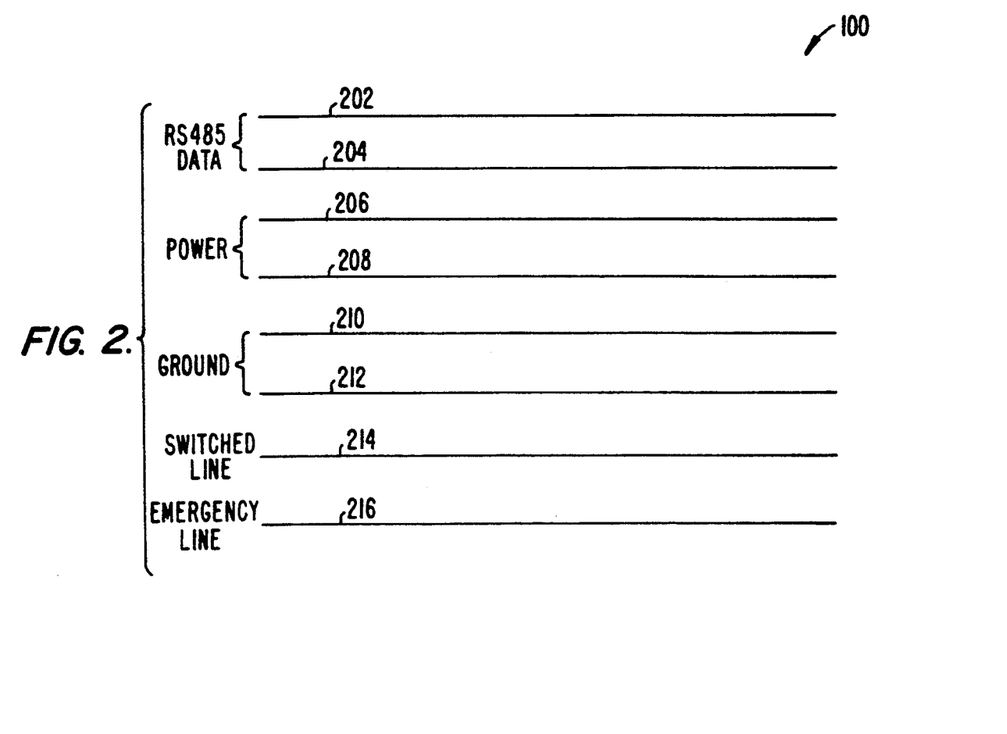
FIG. 2 is a hardware diagram of the network bus of FIG. 1.

The hardware configuration of bus 100 is shown in FIG. 2. There are 8 separate lines shown in bus 100 in FIG. 2. The first two lines, 202 and 204, are the data lines used according to the RS-485 standard. The standard provides for up to 32 unit loads on a two-wire differential, serial digital data link. Also provided to the modules are power lines 206 and 208 and ground lines 210 and 212. Two lines are used for each to minimize the resistance. A switched line 214 originating from user command module 102 of FIG. 1 is controlled by an on/off switch to indicate when the system should power up.

The last element of the bus 100 is an emergency line 216. This line can be connected to shut down circuitry in each module which can bypass the processor and other intelligence to allow an emergency shutdown in the event of a malfunction of a particular module. This allows a parallel bypass of the module processor in the event that there is a malfunction and communications telling the processor to shut down cannot be sent effectively over the RS-485 data link. For example, one module might detect the incline of the seat back in a wheelchair. If the wheelchair is about to go over an incline, and the seat incline is at a dangerous position, it could override the other modules and shut the system down if the chair is not responding to a signal to change the seat incline or stop the wheelchair.

Figure 3:
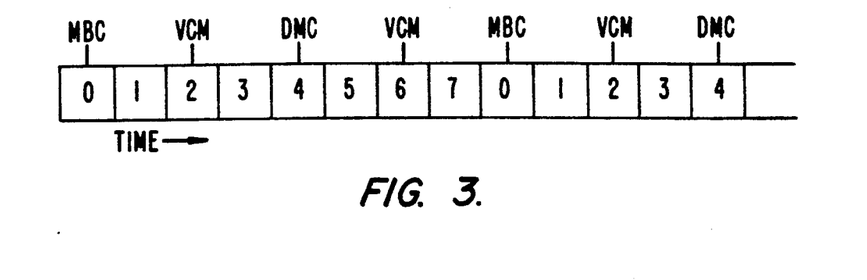
FIG. 3 is a timing diagram showing the multiple frames used in the present invention.

FIG. 3 shows the frame timing in the system having 8 frames, numbered 0-7. The 8 frames keep repeating, with each module on the network being assigned one frame. For instance, in one embodiment, the motherboard controller (MBC) module is assigned the time frame zero. The user command module (UCM) is assigned time frames 2 and 6. With two different time frames, it is provided with the capability to communicate faster and to send more information. Finally, time frame 4 is assigned to the drive motor controller (DMC) module.

Figure 4:
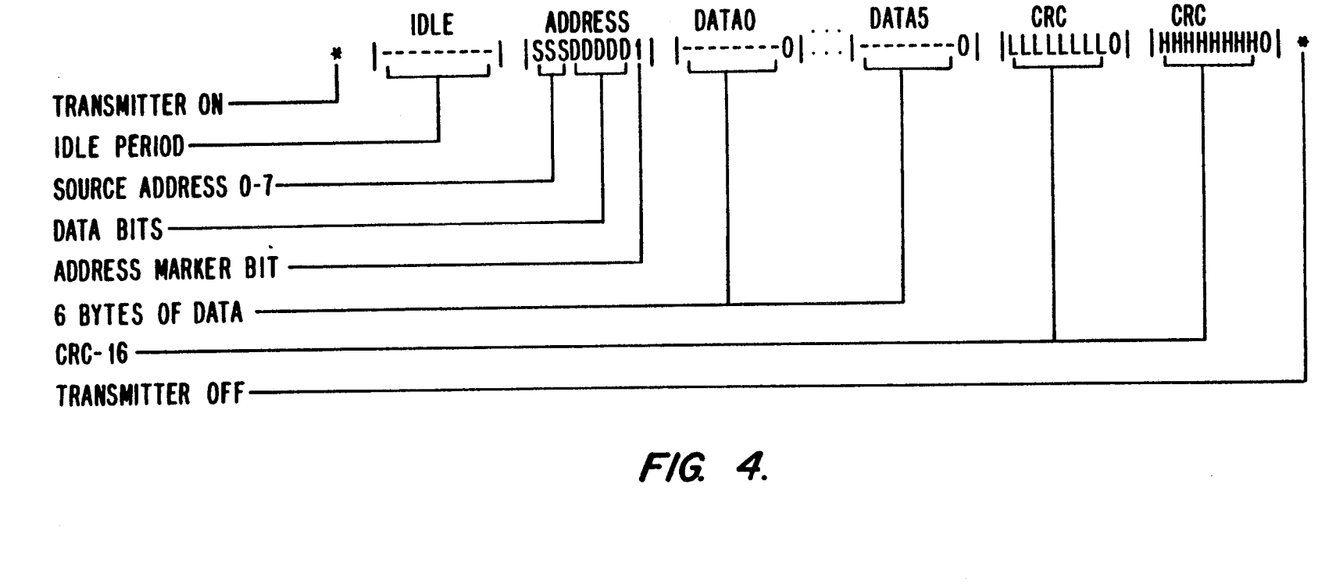
FIG. 4 is a timing diagram of a single frame of FIG. 3.

FIG. 4 is a diagram of a single time frame of FIG. 3. The first byte is an idle byte, followed the source address byte. The address byte has three S-bits designating the source address, allowing up to 8 sources (0-7). The remaining 5 bits are application-specific data bits. The 5-bit field DDDDD is used to represent a "frame type". Thus, each module may have up to 32 different frame types defined. The address field is followed by 6 data bytes. With 6 data bytes per frame combined with the 5 frame types, one module is able to transmit as much as 192 bytes of status information. The last 2 bytes are CRC (cyclic redundancy code) bytes for error detection. The CRC-16 format is used. No destination address is used; each module looks at every transmission.

Figure 5:
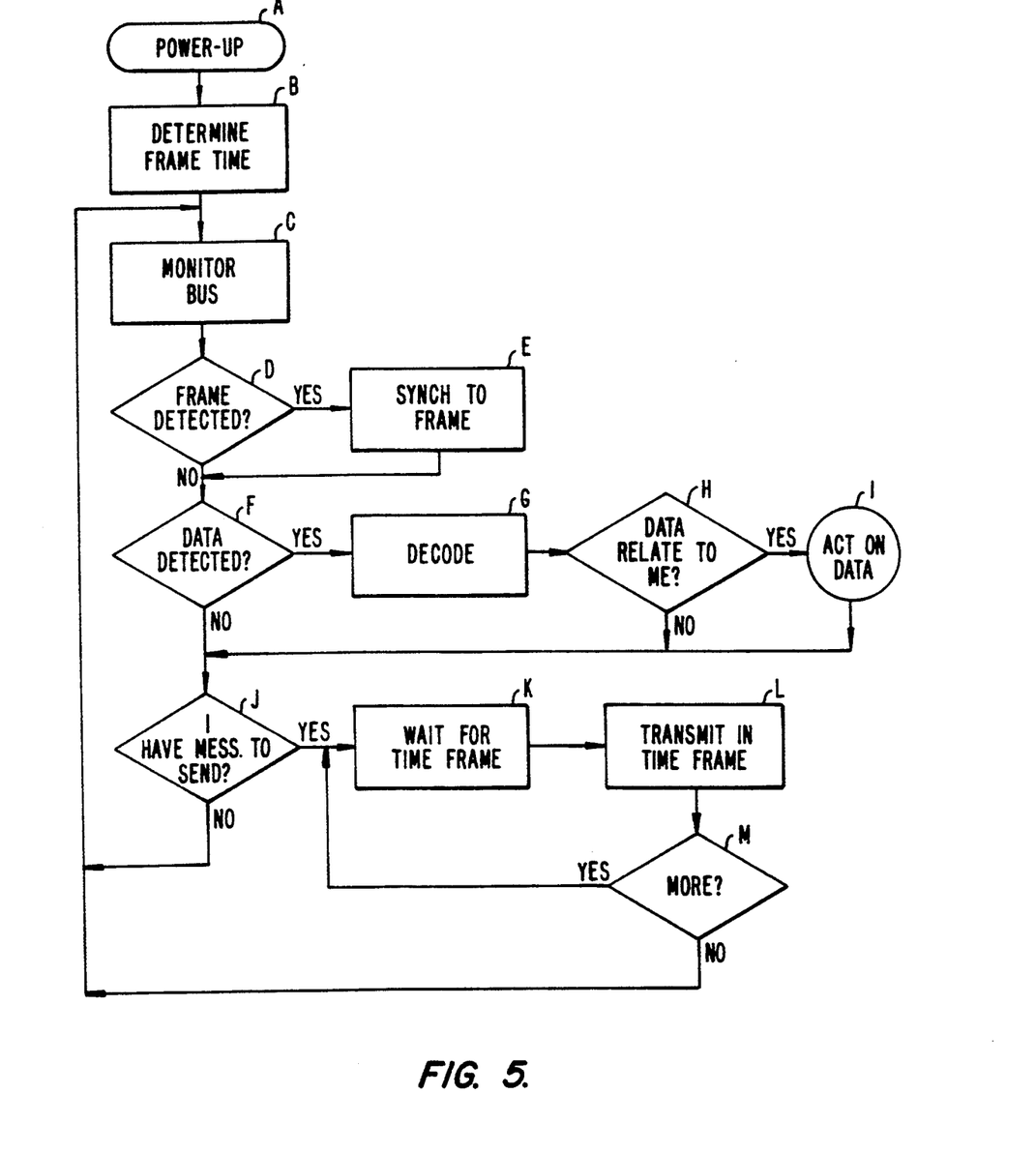
FIG. 5 is a flowchart showing the software control and monitoring of the bus.

FIG. 5 is a flowchart of the software monitoring of the network in each module. On power up of the system (Step A), or after a power interrupt, each module will determine when its frame should occur (Step B). This is determined by multiplying a randomly generated number by the ID of the module. Each module uses the same random number generator, and thus will produce the same random number. Since each ID varies, each module should determine its frame time in time sequential order. Each module monitors the bus (Step C). In the event the frames are not exactly aligned, the first time a frame transmits (Step D), the other modules will synchronize to the transmitting frame (Step E).

When data is detected in a frame (Step F), that data is decoded (Step G). If the source address and data is pertinent to the module doing the decoding (Step H), then the data is acted upon (Step I). If a module has a message to send itself (Step J), it will wait until its timer indicates that its time frame has arrived (Step K). It will then transmit using that time frame (Step L). If the entire message cannot be transmitted in that time frame (Step M), then the module waits until the next time its time frame arrives and continues transmitting.

The preferred embodiment has the following features:
1. RS-485 multi-drop.
2. Up to 32 nodes, 8 of which may transmit data (the others may receive only).
3. Master-less time division protocol.
4. Asynchronous character format (START 9-DATA STOP).
5. Fixed length small data frames (10 bytes including preamble and CRC-16).
6. 9th data bit for frame synchronization.
7. Baud rate on the order of 30,000 bits/second.

This network is specially designed to carry the kinds of data that are particular to wheelchair motor control. Small amounts of data can be communicated between boards at medium to high speeds without requiring the use of problematically high baud rates.

Definitions
1. A "node" represents one physical RS-485 transceiver on the multi-drop line. This is typically associated with one physical board and one CPU but other configurations are possible.
2. A "frame" represents one unit of data that is transmitted as an autonomous unit over the network.
3. A "source" represents one of the 8 possible frame transmitters. A single node may be configured to act as more than one source in order to achieve a higher aggregate throughput of its data. Every source is assigned a unique source address (SA) between 0 and 7.
4. "worst case frame time" (WCFT) is the time required to transmit one complete frame with a 50% margin of error. For the 10-byte frame it is equivalent to 10 bytes X 11 bits/byte X 1.5 or 165 bit-times.
5. "worst case cycle time" (WCCT) is the worst case frame time accumulated for each possible source. Since there can be as many as 8 sources the value is 8×165 or 1,320 bit-times.

Time Division Protocol

Each source transmits a frame in sequence: first SA 0 transmits, then SA 1, etc. up to SA 7 and then back to SA 0. Every source receives and examines every frame that is sent over the network. Since each frame contains the originating source's SA, a source can track the sequence on a frame-by-frame basis and always knows when it is its turn to transmit. This synchronization/tracking proceeds as follows:

Each source keeps a count-down timer that signals its own time to transmit (when the timer goes to zero). Following a power-up reset (or whenever the source loses synchronization) it sets the timer to the worst possible case of (WCCT+SA* WCFT).

Each time a source sees a frame transmitted by another source (or transmits a frame itself), it re-establishes its timer based on the SA of the frame it sees.

There are three special cases that must be considered:
1. What happens if there is no source assigned to a particular source address?
   The time slot for that SA is left empty and nothing is transmitted over the network during that time. Since a source determines when to transmit based on the SA in the most recently received frame, all active sources will naturally "mark time" over slots for SAs not active.
   This may seem somewhat wasteful since a configuration with, say, only 4 SAs assigned would spend half of the network bandwidth doing nothing. On an ordinary network this would certainly be true. This situation is typically the case in time division (aka: time multiplexed or time sliced) communication schemes. On this specialized network it is essentially important that adding sources to a working system should have no impact on the throughput. Simply put, if a controller can tolerate its output bandwidth based on 8 transmitting sources then it can live with that bandwidth at all times. If it cannot tolerate 8 then it has no business on this network. There is no advantage to going faster "sometimes".
2. What happens if a transmission error occurs such that a source does not properly see a frame transmitted by another source?
   The source that doesn't see the frame does not reevaluate its time-to-next-transmission timer for that frame. Since a source decides that it is time for it to transmit based on the time and SA of the last good frame it saw, missing a frame has no net effect on synchronization.
   The integrity of the network as a whole is only as good as the CRC used. That is, the probability that the network will fail completely is less than or equal to the probability that a transmission error on a frame will go undetected because the CRC is still correct.
3. What happens if a source comes on-line for the first time and no frames are observed that allow it to become synchronized?

The initial timer setting of (WCCT+SA*WCFT) handles this. If no frames are received then the time-to-transmit never gets rescheduled. If all of the SAs come on line at about the same time then they all schedule their first transmission at a different time because each uses a different value for SA. In a simple configuration, SA 0 would time out first and do the first frame transmission. Then everyone else would see that and reschedule.

The nominal network configuration consists of three transmit/receive "nodes": The MotherBoard Controller (MBC), the User Command Module (UCM) and the Drive Motors Controller (DMC). Each module has a need to transmit data to each other module.

The driving timing constraint for this configuration is that the UCM must be able to transmit joystick-related speed commands to the DMC with no more than a 30 millisecond lag imposed by the communications. This is achieved by the following parameters:

1. Baud rate=28,800 bits/sec. This makes for a "worst-case frame time" of 5.73 ms and a "worst-case cycle time" of 45.84 ms.
2. Four transmitting "sources":
   Source address 0=MBC
   Source address 4=DMC
   Source addresses 2, 6=UCM By having the UCM transmit as two different source addresses, it is guaranteed a transmission slot every 22.92 ms.

Protocol Generalities

"Status" versus "Event"

In a status-driven protocol scheme a transmitting source continuously transmits information regarding the state of devices over which it has control and responsibility. The state information is transmitted over and over regardless of whether or not any of the data has changed since the last transmission.

The advantages of a status-driven scheme are that the transmission is purely unidirectional. There is no hand-shaking, acknowledgements, etc. to take place. If a receiver of the status data detects a transmission error on a frame of status information, it simply ignores the received data and waits for the next frame to come along. Another advantage is that transmitted data is effectively "broadcast" to all receivers on a multi-drop line so that data intended for different recivers can be transmitted in a single frame or data block without confusion about who must acknowledge the block.

The disadvantages of a status-driven scheme are that in the cases where event occurrence must be communicated (e.g. power failure), the resulting mechanisms are very cumbersome. Also, very fast status changes or "transients" can get lost and never communicated to the outside world. The transmission line is run continuously at bandwidth regardless of whether or not any new information or intelligence is being relayed.

In an event-driven protocol scheme a transmitting source only transmits a frame when a local event occurs that the outside world needs to be informed about. Since each event is relayed in a single transmission the receiving end must transmit an acknowledgement of some kind to inform the original transmitter that knowledge of the event was obtained by the intended receiver.

The advantages of an event-driven scheme are that transmission only occurs (and bus bandwidth is taken up) when something actually happens, typically infrequently as a result of something that an operator does. It is often easier and simpler to design the operation of a micro-controller based on handling and processing of events and commands rather than posting or declaration of status. Event handling is the more intuitive way for an engineer to think about micro-processor control software.

The disadvantages of event-driven communications are that the originator must be prepared to re-transmit the original event information in the case where no acknowledgement to the original was ever gotten while being careful not to re-transmit the same event twice unless the receiver is truly expecting it. This must usually be done with a time-out waiting for the acknowledgement which means that when an error does occur, the communication stream (i.e. other events) gets backed up for some time until the previous transmission problem gets resolved. Schemes for avoiding this situation involve even more complex handshaking yet.

The Time Division Network design of the present invention permits nodes to communicate by means of either status-driven or event-driven schemes, or both, on the same network. For example: Source 0 might transmit a status frame for the benefit of sources 1 and 2 and might transmit a kind of command frame to source 3 only when necessary. Sources 1 and 2 just look at the status when received while source 3 transmit an acknowledgement message back to 0 whenever it receives a command frame from it. Source 0 retransmits the command frame to 3 if it does not receive an acknowledgement within 1 second.

Frame Formats: MBC

The MBC transmits as source address 0. Each of the frame formats shown below is transmitted in sequence, in a round-robin fashion. On each transmission opportunity, the next frame in the sequence is sent.

Figure 6:
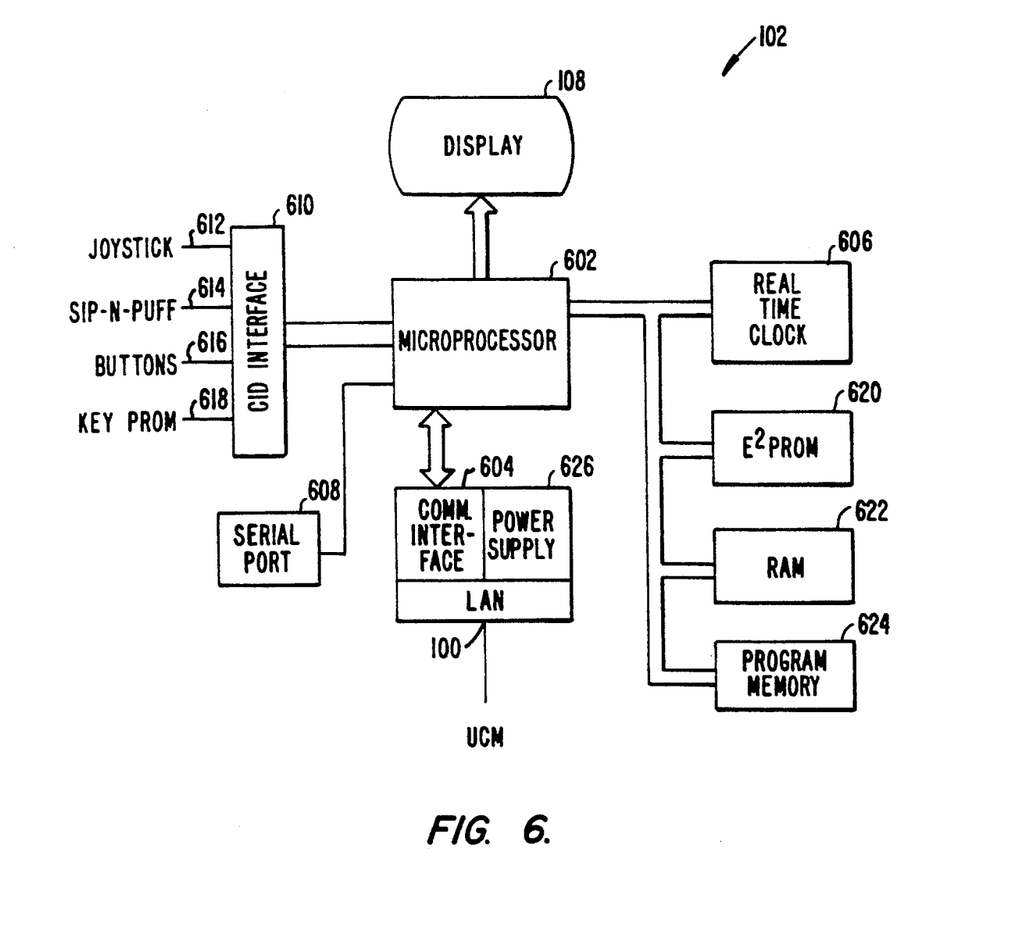
FIG. 6 is a block diagram of the user command module of FIG. 1.

There are essentially three kinds of information to be reported:

1. Software derived status. These indicate conditions arrived at by the software by some internal process. Usually a boolean flag telling about some safety condition that has been decided upon by the software.
2. Switch detections. These are input sense switches or other binary inputs having to do with devices or mechanisms that do not have the possibility of an associated actuator or CPU-controlled way in which to affect or change them. A typical example is a deadman seat switch or a tilt-detection mercury switch. These are given two status bits and are reported to be in one of four states at any time:
   0=not installed
   1=not activated
   2=activated
   3=failure In this case "activated" does not necessarily mean that a switch is depressed or "closed" but that the logical indication of the binary sensor is true.
3. Actuator-affected devices. These represent devices that can have position sensing switches as well as activators to move them. Seat position adjustments are the most common instance of this class of device. Each has two status fields associated with it. One tells the sensed state of the mechanism while the other tells the instantaneous status of the actuator or "changing" mechanism itself. A few examples follow:
   Actuator states:
   0=not installed
   1=idle 2=moving
3=failure
Position status:
$00=sensing mechanism is not installed
$01=minimum position: all the way down, back, etc.
$FE=maximum position: all the way up, forward, etc.
$FF=sensing mechanism failure FIG. 6 is a block diagram of the user command module 102 of FIG. 1. A microprocessor 602 is connected through an interface 604 to the local area network 100. Microprocessor 602 is also connected to display 108 as shown in FIG. 1. The module includes a real time clock 606 and a serial port 608. Inputs come through a control input device interface 610. These inputs could be, for instance, a joystick 612, a sip-n-puff input 614, pushbuttons 616, and a keyPROM 618. The microprocessor is also connected to EEPROM 620 which stores the keyPROM key. In addition, there is RAM 622 and program memory in a PROM 624. Power is provided to the module by a power supply 626.

Figure 7:
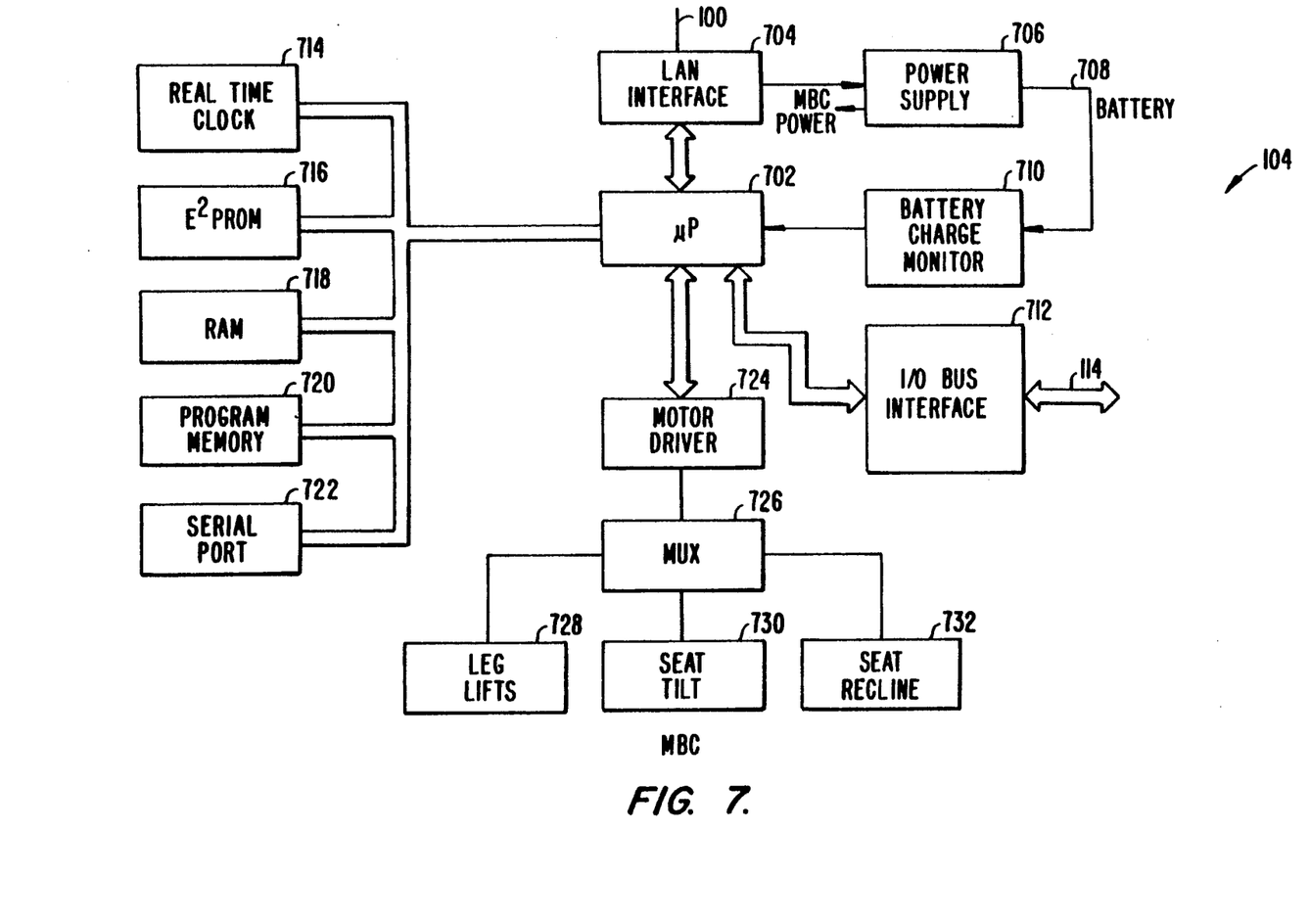
FIG. 7 is a block diagram of the motherboard controller module of FIG. 1.

FIG. 7 is a block diagram of the motherboard controller 104 of FIG. 1. The motherboard controller has a microprocessor 702 connected through a local area network interface 704 to the network link 100. A power supply 706 supplies power to the module. A battery connection 708 is monitored by a battery charged monitor 710. An I/O bus interface 712 connects to I/O lines 114 of FIG. 1.

Microprocessor 702 is also connected to a real time clock 714, EEPROM 716, RAM 718 and a program memory 720. A serial port 722 is provided for direct access and diagnostics. The microprocessor also connects to motor driver circuitry 724 which is connected through a multiplexer 726 to drive controls for leg lifts 728, seat tilt 730 and seat recline 732.

Figure 8:
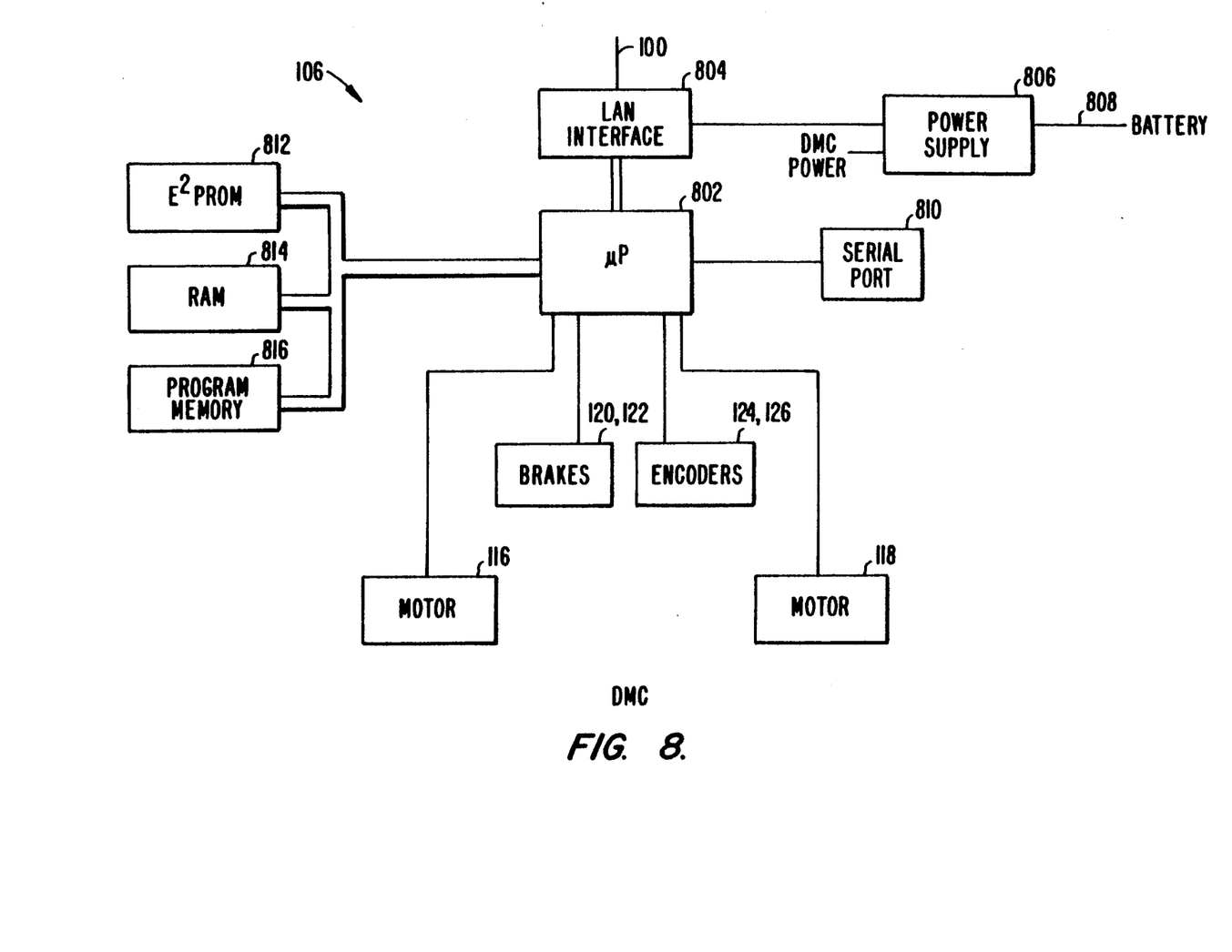
FIG. 8 is a block diagram of the drive motor control module of FIG. 1.

FIG. 8 is a block diagram of the drive motor controller 106 of FIG. 1. It includes a microprocessor 802 which connects through a local area network interface 804 to the network 100. A power supply 806 provides power to the module. There is a battery connection 808. A serial port 810 is provided. The microprocessor interfaces to motors 116, 118, brakes 120, 122 and encoders 124, 126 in the manner shown in FIG. 1. In addition, the microprocessor has EEPROM 812, RAM 814 and program memory 816.

In the present invention, if one module shuts down, the others can still operate within a safe range. For example, if the motherboard should fail, the user could still directly drive the wheelchair at a minimum speed and rate of turn. This enhances the reliability of the wheelchair by distributing the intelligence throughout the module, making it more fail-safe.

Each module also has its own serial link so that it can be accessed separately from the network connection for individual access for diagnostics or other reasons. The motherboard controller has a number of I/O ports along it to connect to add-on features. Examples would be an infrared phone link, environmental control unit (for controlling telephone, TV, stereo, computer, lighting, doors, security, etc.), a universal IR module, and emergency locating system (ELS), a module for monitoring physiological parameters of the wheelchair patient (EKG, pulse, etc.), a radial link to the monitor; a self-mapping module for route-finding and route-retracing, and a speech synthesis module.

As will be understood by those familiar with the art, the present invention may be embodied in other specific forms without departing from the spirit or essential characteristics thereof. For example, another physical bus structure could be used to accommodate the time frame, master-less network protocol of the present invention. Accordingly, the disclosure of the preferred embodiment of the invention is intended to be illustrative, but not limiting, of the scope of the invention which is set forth in the following claims.

What is claimed is:

1. An apparatus for communicating between modules of a motor control system, comprising:
   a motor control module;
   an input/output module;
   a processing module;
   means for storing a unique ID in each of said modules;
   a bus interconnecting said modules;
   means for transmitting information from each of said modules over said bus in a time frame corresponding to such module; and
   means for monitoring said bus at each of said modules and updating an internal clock used to track said time frames in response to a detected transmission;
   wherein said bus comprises a two wire differential data link and further including an emergency line in parallel with said data link for sending a shutdown signal in parallel with communications over said data link in the event of a failure of said data link or a receiver in one of said modules coupled to said data link.

2. An apparatus for communicating between modules of a motor control system, comprising:
   a motor control module;
   an input/output module;
   a processing module;
   means for storing a unique ID in each of said modules;
   a bus interconnecting said modules;
   means for transmitting information from each of said modules over said bus in a time frame corresponding to such module; and
   means for monitoring said bus at each of said modules and updating an internal clock used to track said time frames in response to a detected transmission;
   wherein a transmission in one of said time frames consists of an address byte, followed by multiple data bytes, followed by a pair of CRC error detection bytes.

3. The apparatus of claim 2 wherein said address byte includes source address bits followed by data type bits.

* * * * *